United States Patent
Zhang

(10) Patent No.: US 12,470,767 B2
(45) Date of Patent: Nov. 11, 2025

(54) VIDEO INTERACTION METHOD AND DEVICE, ELECTRONIC DEVICE AND STORAGE MEDIUM

(71) Applicant: Beijing Bytedance Network Technology Co., Ltd., Beijing (CN)

(72) Inventor: Tingting Zhang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/815,871

(22) Filed: Jul. 28, 2022

(65) Prior Publication Data

US 2022/0368980 A1     Nov. 17, 2022

Related U.S. Application Data

(63) Continuation of application No. PCT/CN2021/105613, filed on Jul. 9, 2021.

(30) Foreign Application Priority Data

Jul. 23, 2020 (CN) .......................... 202010719649.4

(51) Int. Cl.
*H04N 7/173*     (2011.01)
*G06F 3/04847*     (2022.01)
(Continued)

(52) U.S. Cl.
CPC ..... *H04N 21/4316* (2013.01); *G06F 3/04847* (2013.01); *H04N 7/147* (2013.01)

(58) Field of Classification Search
CPC . H04N 21/4316; H04N 7/147; G06F 3/04847
See application file for complete search history.

(56) References Cited

U.S. PATENT DOCUMENTS

| 8,458,053 | B1 * | 6/2013 | Buron | H04N 21/4316 |
| | | | | 705/26.1 |
| 10,692,020 | B2 * | 6/2020 | Marianko | H04L 65/1069 |

(Continued)

FOREIGN PATENT DOCUMENTS

| CN | 104615335 A | 5/2015 |
| CN | 105933739 A | 9/2016 |

(Continued)

OTHER PUBLICATIONS

Extended European Search Report in EP21845916.2, mailed May 11, 2023, 9 pages.

(Continued)

*Primary Examiner* — Annan Q Shang
(74) *Attorney, Agent, or Firm* — Astute IP Law Group

(57) ABSTRACT

A video interaction method and device, an electronic device and a storage medium are provided. The method includes: when a target interactive video in a video playing interface is played to a set time node, popping up a prompt window; if an object pick-up instruction is received, then, an invitation password is generated, and switching the prompt window into a password window corresponding to the invitation password, the object receiving instruction being generated when a user clicks a receiving control in the prompt window. Upon receiving the invitation instruction, the current display interface is switched to a sharing interface corresponding to the invitation password, for the user to share the invitation password, the invitation instruction is generated when the user clicks on the invitation control in the password window; if the invitation password is shared, the object to be received is issued to the current login account.

18 Claims, 6 Drawing Sheets

(51) Int. Cl.
*H04N 7/14* (2006.01)
*H04N 21/431* (2011.01)

(56) References Cited

U.S. PATENT DOCUMENTS

| | | | |
|---|---|---|---|
| 2004/0104926 A1 | 6/2004 | Murray et al. | |
| 2015/0206349 A1* | 7/2015 | Rosenthal | G06T 19/006 345/633 |
| 2015/0312607 A1* | 10/2015 | Walker | G06Q 50/01 725/35 |
| 2016/0104508 A1 | 4/2016 | Chee et al. | |
| 2016/0381427 A1* | 12/2016 | Taylor | H04N 21/472 725/13 |
| 2017/0289608 A1 | 10/2017 | Li et al. | |
| 2018/0255360 A1 | 9/2018 | Li | |
| 2019/0075340 A1* | 3/2019 | Hochart | H04N 21/4882 |
| 2019/0104344 A1* | 4/2019 | Smith | H04N 21/812 |
| 2020/0336804 A1 | 10/2020 | Cui et al. | |

FOREIGN PATENT DOCUMENTS

| | | |
|---|---|---|
| CN | 106534941 A | 3/2017 |
| CN | 108289229 A | 7/2018 |
| CN | 108769814 A | 11/2018 |
| CN | 109862381 A | 6/2019 |
| CN | 110505072 A | 11/2019 |
| CN | 110766446 A | 2/2020 |
| CN | 111787415 A | 10/2020 |
| JP | 2008262512 A | 10/2008 |
| JP | 2018533784 A | 11/2018 |
| WO | 2014207938 A1 | 12/2014 |

OTHER PUBLICATIONS

International Search Report for International Patent Application No. PCT/CN2021/105613, mailed Oct. 11, 2021 (9 pages).
Communication Pursuant to Article 94(3) EPC for European Patent Application No. 21845916.2, mailed on Oct. 21, 2024, 5 pages.
Office Action in JP2022546044, mailed Sep. 12, 2023, 2 pages.

* cited by examiner

VIDEO INTERACTION METHOD AND DEVICE, ELECTRONIC DEVICE AND STORAGE MEDIUM

CROSS REFERENCE OF RELATED APPLICATION

The present application is a continuation of International Application No. PCT/CN2021/105613, titled "VIDEO INTERACTION METHOD AND DEVICE, ELECTRONIC DEVICE AND STORAGE MEDIUM", filed on Jul. 9, 2021, which claims priority to Chinese Patent Application No. 202010719649.4, titled "VIDEO INTERACTION METHOD AND DEVICE, ELECTRONIC DEVICE AND STORAGE MEDIUM", filed on Jul. 23, 2020 with the China National Intellectual Property Administration, both of which are incorporated herein by reference in their entireties.

FIELD

Embodiments of the present disclosure relate to computer technology, and in particular to a video interaction method, a video interaction device, an electronic apparatus, and a storage medium.

BACKGROUND

With the development of Internet technology, websites and corresponding clients are increasing in number.

In order to attract users to pay attention to a website or client constantly, an operator of the website or client generally sets up a quest reward system in a business server of the website or client. Quest, such as logging in the website or client continuously for a set number of days, may be pushed to the user through the quest reward system, and rewards corresponding to the quest may be given to the user after the quest is finished.

However, the existing websites or clients generally display quests and give quest rewards on an HIML5 (H5) event page or front-end page only, and the manner for pushing the quests is relatively simple.

SUMMARY

A video interaction method, a video interaction device, an electronic apparatus and a storage medium are provided according to embodiments of the present disclosure, so as to provide various manners for pushing tasks, thereby improving the effect of task pushing and promotion effect of corresponding products.

In a first aspect, a video interaction method is provided according to an embodiment of the present disclosure. The method includes:

popping up a prompt window when a target interaction video in a video playback interface is played to a set time node, where object information of a to-be-received object is displayed in the prompt window;

generating an invitation code in response to a reception of an object receiving instruction, and switching the prompt window to a code display window corresponding to the invitation code, where the object receiving instruction is generated when a user clicks a receiving control in the prompt window, and the invitation code is used for inviting another user to receive the to-be-received object;

switching a current display interface to a sharing interface corresponding to the invitation code, in response to a reception of an invitation instruction, to share the invitation code by the user, where the invitation instruction is generated when the user clicks an invitation control in the code display window; and sending the to-be-received object to a current login account in a case that the invitation code is shared successfully.

In a second aspect, a video interaction device is further provided according to an embodiment of the present disclosure. The apparatus includes: a window popping module, a code generation module, a code sharing module, and an object sending module.

The window popping module is configured to pop up a prompt window when a target interaction video in a video playback interface is played to a set time node, where object information of a to-be-received object is displayed in the prompt window.

The code generation module is configured to generate an invitation code in response to a reception of an object receiving instruction, and switch the prompt window to a code display window corresponding to the invitation code, where the object receiving instruction is generated when the user clicks a receiving control in the prompt window, and the invitation code is used for inviting another user to receive the to-be-received object.

The code sharing module is configured to switch a current display interface to a sharing interface corresponding to the invitation code in response to a reception of an invitation instruction, to share the invitation code by the user, where the invitation instruction is generated when the user clicks an invitation control in the code display window.

The object sending module is configured to send the to-be-received object to a current login account after the invitation code is shared successfully.

In a third aspect, an electronic apparatus is further provided according to an embodiment of the present disclosure. The electronic apparatus includes one or more processors and a memory. The memory is configured to store one or more programs that, when executed by the one or more processors, cause the one or more processors to implement the video interaction method according to the embodiment of the present disclosure.

In a fourth aspect, a computer-readable storage medium is further provided according to an embodiment of the present disclosure. The computer-readable storage medium stores a computer program that, when executed by a processor, implements the video interaction method according to the embodiment of the present disclosure.

In a fifth aspect, a computer program product is further provided according to an embodiment of the present disclosure. The computer program product includes computer program instructions that cause a computer to implement the video interaction method according to the embodiment of the present disclosure.

In a sixth aspect, a computer program is further provided according to an embodiment of the present disclosure. When the computer program runs on a computer, the computer implements the video interaction method according to the embodiment of the present disclosure.

With the video interaction method and apparatus, the electronic apparatus and the storage medium according to embodiments of the present disclosure, a prompt window pops up when the target interaction video in the video playback interface is played to the set time node. In response to a reception of an object receiving instruction generated when a user clicks a receiving control in the prompt window, an invitation code is generated and the prompt window displayed in the video playback interface is switched to a code display window. Then, the current display interface is switched to the sharing interface corresponding to the invitation code in response to a reception of an invitation instruction generated when the user clicks the invitation control in the code display window, and the to-be-received object corresponding to the prompt window is sent to the current login account when it is determined that the invitation code in the sharing interface is successfully shared. With the above technical solutions in the embodiments, the prompt window pops up when the user watches the interaction video, and the corresponding object is sent to the current login account after the user shares the invitation code successfully. In this way, not only various interaction manners and various manners for pushing an interaction task are provided, thereby making the interaction task have a great attraction; but also an interaction way for other users is provided, thereby reducing difficulty for other users to interact with the electronic apparatus through the corresponding client.

BRIEF DESCRIPTION OF THE DRAWINGS

The above and other features, advantages and aspects of the embodiments of the present disclosure will become more apparent in combination with the drawings and with reference to the following detailed description. Throughout the drawings, the same or similar reference numbers refer to the same or similar elements. It should be understood that the drawings are illustrative and that the components and elements are unnecessarily drawn to scale.

DETAILED DESCRIPTION

Figure 1:
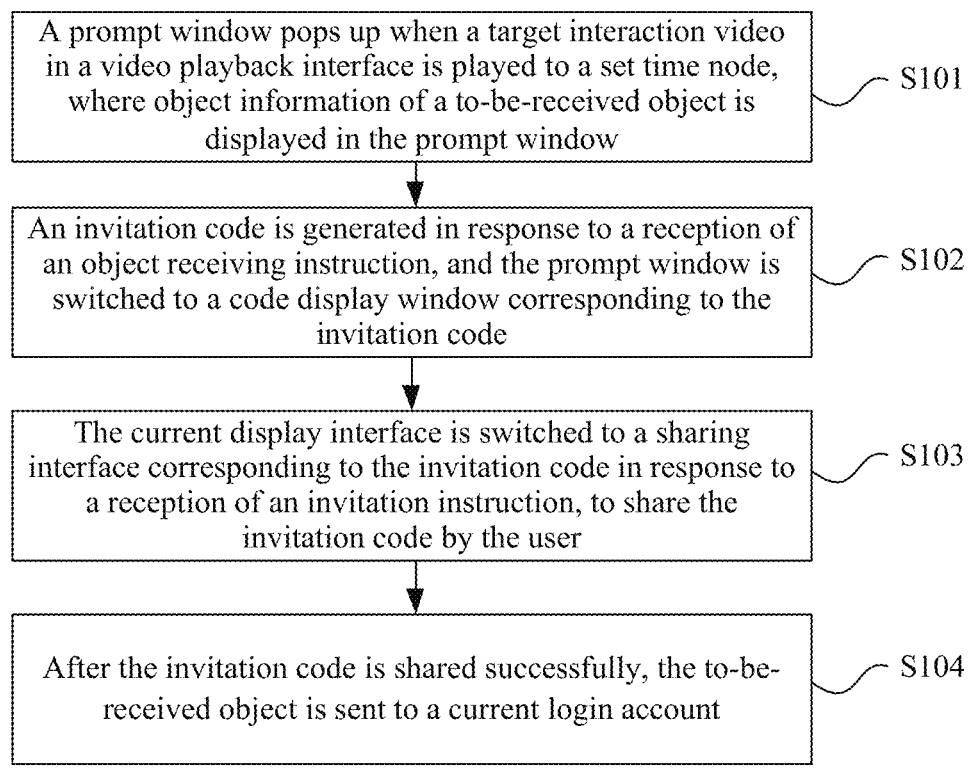
FIG. 1 is a schematic flowchart illustrating a video interaction method according to an embodiment of the present disclosure.

Embodiments of the present disclosure are to be described in more detail below with reference to the drawings. Although some embodiments of the present disclosure are illustrated in the drawings, it should be understood that the present disclosure may be embodied in various forms and should not be construed as limited to the embodiments set forth herein. Instead, these embodiments are provided for a thorough and complete understanding of the present disclosure. It should be understood that the drawings and embodiments of the present disclosure are only for illustrative purposes, and are not intended to limit the protection scope of the present disclosure.

It should be understood that the steps described in the method embodiments of the present disclosure may be performed in a different order and/or in parallel. Furthermore, method embodiments may include an additional step and/or an illustrated step may not be performed. The scope of the present disclosure is not limited in this regard.

The term "including" and variations thereof herein are open-ended inclusions, that is, "including but not limited to". The term "based on" indicates "based at least in part on." The term "one embodiment" indicates "at least one embodiment". The term "another embodiment" indicates "at least one additional embodiment". The term "some embodiments" indicates "at least some embodiments". Definitions of other terms are given in the description below.

It should be noted that the concepts such as "first" and "second" herein are only to distinguish one device, module or unit from another, rather than limit the order or interdependence of functions performed by these devices, modules or units.

It should be noted that determiners such as "a" and "a plurality" herein are illustrative rather than restrictive, and those skilled in the art should understand that unless the context clearly indicates otherwise, the determiners should be understood as "one or more".

The name of a message or information exchanged between devices in the embodiments of the present disclosure are only for illustrative purposes, and are not intended to limit the scope of the message or information.

FIG. 1 is a schematic flowchart illustrating a video interaction method according to an embodiment of the present disclosure. The method may be performed by a video interaction device. The device may be implemented by software and/or hardware, and may be configured in an electronic apparatus, typically, a smartphone, a tablet computer or a computer. Optionally, the video interaction method according to the embodiment of the present disclosure is applicable to a scene of watching a video in a video playback interface, and is especially applicable to a scene of watching a video on a home page (for example, a video recommendation page) of a website or client. The following description is made with a scene of watching a video on the home page of the client as an example.

As shown in FIG. 1, the video interaction method according to the embodiment of the present disclosure includes the following steps S101 to S104.

In S101, a prompt window pops up when a target interaction video in a video playback interface is played to a set time node, where object information of a to-be-received object is displayed in the prompt window.

Figure 2:
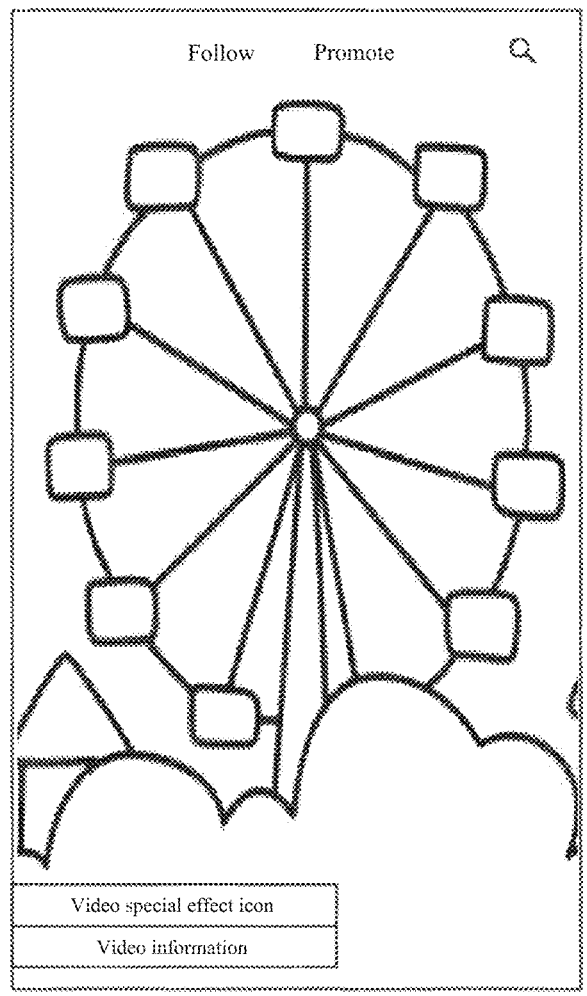
FIG. 2 is a schematic diagram illustrating a video playback interface according to an embodiment of the present disclosure.
Figure 3:
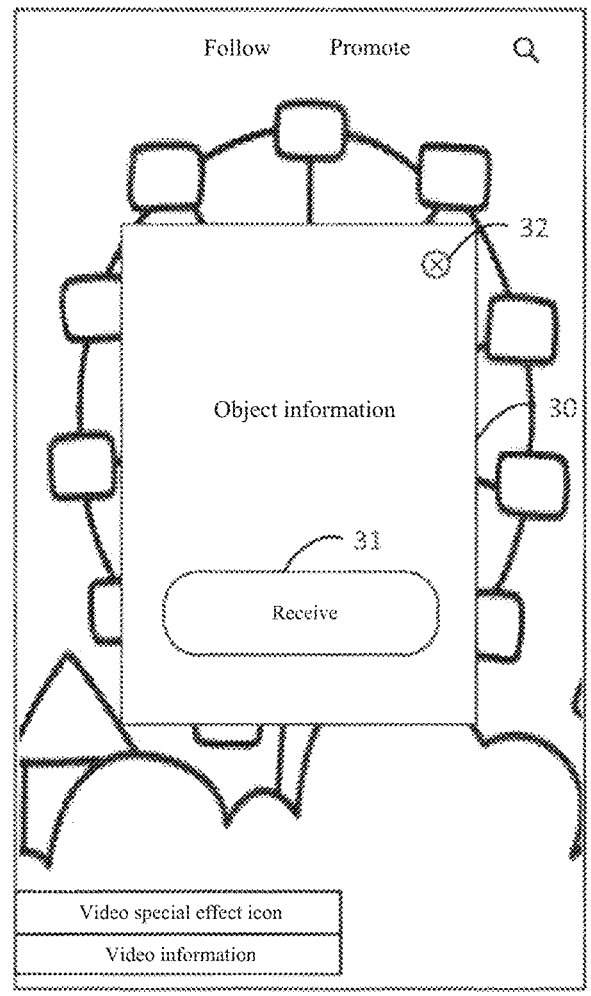
FIG. 3 is a schematic diagram illustrating a prompt window according to an embodiment of the present disclosure.

The to-be-received object may be a virtual item such as a bonus, a special effect or a reward point. The video playback interface is an interface for playing a video on a target client (that is, a client to which the video playback interface belongs). In addition to a frame of a currently playback video (such as the target interaction video), video information (such as a video name and publisher information of the video) and a video special effect icon of the currently playback video are also displayed in the video playback interface, as shown in FIG. 2. A user may view video special effect information of the currently playback video by clicking the video special effect icon. The video playback interface may be a webpage or a page in a client. That is, the user watches the video through a website or client operated by a corresponding developer. The following description is made with an example in which the user watches the video through the client. As shown in FIG. 3, the pop-up prompt window 30 may display object information of the to-be-received object and a receiving control 31. The user may receive the to-be-received object corresponding to a code display window by clicking the receiving control 31.

In this embodiment, the target interaction video may be an interaction video included in a current video stream. The interaction video may be specifically understood as a video in which a corresponding window can pop up to interact with the user in the video playing process. The interaction video may be pre-recorded by the developer and stored on a server. The set time node at which the prompt window pops up and the to-be-received object corresponding to the interaction video may be set by the developer as demand, when the interaction video is recorded. In an example, the set time node may be any time instant or a time instant at which the interaction video is played to content related to the to-be-received object. When the to-be-received object is bonus, the set time node may be a time node corresponding to a video frame including a red packet image in the interaction video. When the to-be-received object is a special effect, the set time node may be a time instant corresponding to a video frame including the special effect in the interaction video. The to-be-received objects in different interaction videos may be the same or different. In an embodiment, the to-be-received object is set based on video content of the interaction video, so as to improve user enthusiasm for interaction.

In an embodiment, an electronic apparatus plays the target interaction video in the video playback interface (as shown in FIG. 2), and periodically determines whether the target interaction video is played to the set time node. If the target interaction video is played to the set time node, a prompt window pops up (as shown in FIG. 3). If the target interaction video is not played to the set time node, the target interaction video keeps playing. A manner for popping up the prompt window may be selected flexibly as demand. For example, the prompt window slides out horizontally from one side of the video playback interface along a set track. Alternatively, the prompt window slides out from one side of the video playback interface along a set track with rotating clockwise or counterclockwise along one side or a mid-perpendicular line of one side of the prompt window. Alternatively, the prompt window is displayed directly at a set position on the video playback interface. Here, a speed at which the prompt window slides out may be set as demand. Before, after, or while the prompt window pops up, may pause or still play the target interaction video. Preferably, the electronic apparatus pauses the target interaction video. Correspondingly, after the prompt window or code display window is closed, the electronic apparatus may go on playing the target interaction video, such that the user may watch the target interaction video completely. The following description is made with this case as an example.

In this embodiment, the electronic apparatus may play a video in the video playback interface, based on a current video stream including a video playing in the video playback interface currently. For example, after finishing playing a video, the electronic apparatus plays this video again, or plays a video that follows this video in the video stream at the video playback interface. The electronic apparatus may switch a video currently played in the video playback interface to another video in the current video stream, in response to a trigger operation of the user on the video playback interface. The current video stream includes the target interaction video and an ordinary video (that is, a video without interaction). The current video stream can be obtained by inserting the target interaction video into an original video stream including only the ordinary video. The target interaction video, and the ordinary video in the original video stream may be determined by the server and sent from the server to the electronic apparatus.

In an embodiment, when switching to the video playback interface, the electronic apparatus determines the current video stream; and switches a video in the current video stream played in the video playback interface, in response to a sliding operation of the user on the video playback interface. In this case, the electronic apparatus preferably generates a video sending request carrying login state information of the user, and sends the video sending request to the server. The video sending request is used for requesting the server to send the target interaction video corresponding to the login state information to a local terminal. The target interaction video is inserted at a set position of an original video stream to obtain the current video stream for a video playback this time. In response to a reception of a video switching instruction, the video currently played in the video playback interface is switched to another video based on the current video stream. The video switching instruction is generated in response to a detection of sliding up and down on the video playback interface.

While starting the target client and entering the video playback interface of the target client, the electronic apparatus acquires login state information (such as a login state and a login account) of the user in the target client, generates a video sending request carrying the login state information, and sends the video sending request to the server corresponding to the target client. Correspondingly, the server receives the video sending request from the electronic apparatus, selects an ordinary video according to a set selection rule to form the original video stream, selects one or more target interaction videos based on the login state information of the user, and sends the ordinary video in the original video stream and the selected target interaction video to the electronic apparatus. After receiving the original video stream and the target interaction video from the server, the electronic apparatus inserts the target interaction video into the original video stream at the set position. In the case of only one target interaction video, the target interaction video may be inserted between an n-th (where n is an integer greater than or equal to 0) ordinary video and an (n+1)-th ordinary video in the original video stream. In the case of multiple interaction videos, the target interaction videos may be inserted in the original video stream at intervals of m (where m is a positive integer) ordinary videos, until all the target interaction videos are inserted or the number of ordinary videos that follows the last inserted target interaction video is less than n. In this way, the current video stream for video playback this time is obtained. The video currently played in the video playback interface is switched based on the current video stream in response to the received video switching instruction. For example, when the user performs an upward sliding operation, the video played in the video playback interface is switched to a previous video of a currently playing video in the current video stream. When the user performs a downward sliding operation, the video played in the video playback interface is switched to a next video of a currently playing video in the current video stream.

In the above embodiment, when n is greater than 0, the server first selects one or more ordinary videos in the original video stream and sends the selected ordinary video to the electronic apparatus for playing, and then selects a target interaction video and sends the target interaction video to the electronic apparatus, thereby improving a response speed of the electronic apparatus and shortening a wait of the user. When selecting a video (the target interaction video and/or the ordinary video in the original video stream), the server may select the video based on at least one of the number of views, the number of likes, and the number of reposts in the case that the user does not log in, and select a video based on at least one of video type information that the user likes, the number of views, the number of likes, and the number of reposts in the case that the user has logged in. The selected video may preferably be a video that the user has not watched, so as to improve user experience when watching the video. Preferably, the target interaction video sent by the server is a new user interaction video and the prompt window is a new user prompt window, in the case that the user is in a log-out state. The target interaction video sent by the server is an interaction video which has not be watched by the user, and the prompt window is a common user prompt window, in the case that the user in in a login state. The video type information that the user likes may be determined based on attribute information and/or viewing history of the user, or determined based on a selection operation by the user. That is, the user selects a video type that the user likes. The interaction video which has not been watched may be understood as an interaction video that the user has not watched. The normal user prompt window may be a prompt window rather than the new user prompt window. After the user watches a video in the video stream, the server may label the video watched by the user as a watched video of the user.

It should be understood that in this embodiment, the server may insert the target interaction video into the original video stream to obtain the current video stream, and sends the video to the electronic apparatus based on the current video stream. In this case, when receiving the video sent by the server, the electronic apparatus directly switches the video currently played in the video playback interface, based on the current video stream in response to the received video switching instruction.

In S102, an invitation code is generated in response to a reception of an object receiving instruction, and the prompt window is switched to a code display window corresponding to the invitation code. The object receiving instruction is generated when a user clicks a receiving control in the prompt window, and the invitation code is used for inviting another user to receive the to-be-received object.

Figure 4:
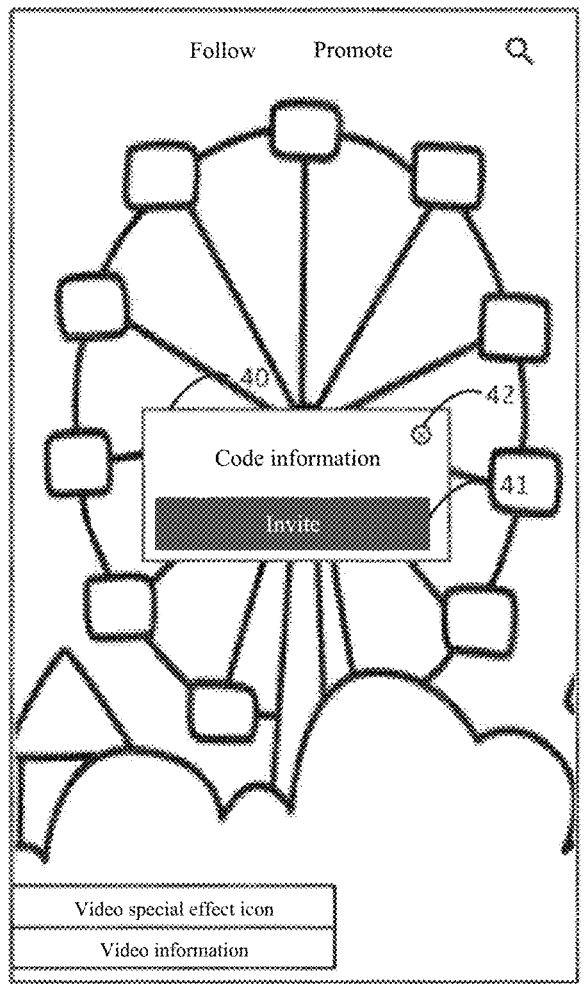
FIG. 4 is a schematic diagram illustrating a code display window according to an embodiment of the present disclosure.

In this embodiment, the object receiving instruction is used to instruct the electronic apparatus to generate an invitation code corresponding to the to-be-received object, and display a code display window corresponding to the invitation code. As shown in FIG. 4, the code display window 40 displays code information, an invitation control 41 and a code closing control 42 of the generated invitation code. Therefore, the user may share the generated invitation code by clicking the invitation control 41 in the code display window, and close the code display window 40 by clicking the code closing control 42 in the code display window to resume watching the target interaction video. That is, the electronic apparatus may close the code display window 40 and resume playing the target interaction video, when detecting that the user clicks the code closing control 42 in the code display window 40. The generated invitation code may be applicable to various clients, or only one client. When the invitation code is applicable to only one client, a client is selected to share the invitation code randomly, based on a preset priority or based on a selection operation of the user. The client to which the invitation code is to be shared may be the target client or other client. The code information displayed in the code display window may or may not include client information of the client to which the invitation code is to be shared, which will not be limited in this embodiment.

In an embodiment, after the prompt window pops up on the electronic apparatus, the user may click the receiving control in the prompt window to receive the to-be-received object corresponding to the prompt window. Correspondingly, when detecting that the user clicks the receiving control in the prompt window, the electronic apparatus confirms a reception of the object receiving instruction, generates an invitation code for the client to which the invitation code is to be shared, closes the prompt window displayed in the video playback interface, and displays a code display window corresponding to the generated invitation code in the video playback interface.

In an embodiment, before generating the invitation code, it is determined whether a user login state. Correspondingly, the video interaction method according to this embodiment further includes: switching a current display interface to a user login interface to prompt the user to log in with an account in the case that the user is in a log-out state; determining whether a current login account that the user logs in on the user login interface is a new account for first login; sending the to-be-received object to the current login account if the current login account is the new account; and switching the current display interface to the video playback interface, and displaying the common user prompt window in the video playback interface if the current login account is not the new account.

In the above embodiment, when the user is a new user, the to-be-received object is directly sent to the account logged in by the new user without sharing the invitation code by the new user, so as to improve satisfaction of the new user for the target client.

In an embodiment, in response to the reception of the object receiving instruction, the electronic apparatus determines whether the user logs in; generates an invitation code and switches the prompt window displayed in the video playback interface to a code display window corresponding to the invitation code if the user has logged in; and switches the current display interface from the video playback interface to the user login interface so as to guide the user to log in or register an account on the user login interface if the user does not log in. After the user has logged in, the electronic apparatus determines whether the current login account of the user is a new account for first login, sends the to-be-received object to the current login account in the case of a new account for first login, and switches the current display interface to the video playback interface and replaces the new user prompt window displayed in the video playback interface with the common user prompt window in the case of not a new account.

In S103, the current display interface is switched to a sharing interface corresponding to the invitation code in response to a reception of an invitation instruction, to share the invitation code by the user, where the invitation instruction is generated when the user clicks the invitation control in the code display window.

Figure 5:
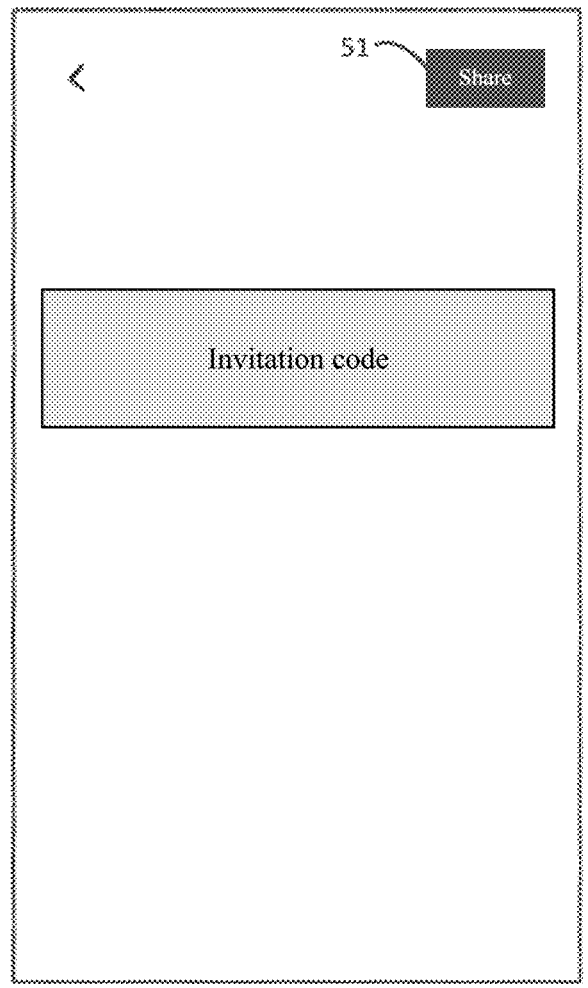
FIG. 5 is a schematic diagram illustrating a sharing interface according to an embodiment of the present disclosure.

The invitation instruction may be used to instruct the electronic apparatus to switch the current display interface to the sharing interface. The sharing interface is an interface by which the user may share the invitation code, and displays the invitation code to be shared and a sharing control 51 which is used to trigger a sharing operation by the user, as shown in FIG. 5.

After the electronic apparatus displays the code display window to the user through a screen, the user clicks the invitation control in the invitation code display window in order to share the invitation code corresponding to the code display window. Correspondingly, after detecting that the user clicks the invitation control in the code display window, the electronic apparatus confirms the reception of the invitation instruction, and switches the current display interface from the video playback interface to the sharing interface corresponding to the invitation code. Therefore, after deciding to share the invitation code, the user clicks the sharing control in the sharing interface. When detecting that the user clicks the sharing control in the sharing interface, the electronic apparatus confirms the reception of the sharing instruction, and sends the sharing instruction to the server of the client the sharing interface to which the invitation code is to be shared, so as to share the invitation code.

In S104, after the invitation code is shared successfully, the to-be-received object is sent to a current login account.

The current login account may be understood as an account currently logged in on the target client to which the video playback interface belongs.

In an embodiment, after the current display interface is switched to the sharing interface, the electronic apparatus periodically detects an operation of the user sharing the invitation code to a corresponding position, for example, periodically detects whether the user shares the invitation code in a sharing interface. The electronic apparatus determines that the invitation code is shared successfully and sends the to-be-received object to the current login account, when detecting that the user has shared the invitation code. For example, after the to-be-received object is sent to the current login account, the electronic apparatus switches the current display interface back to the video playback interface, and resumes playing the target interaction video or plays a next video of the target interaction video in the video playback interface.

A manner of sending the to-be-received object to the current login account depends on an object type of the to-be-received object. When the to-be-received object is the bonus, an account balance of the current login account is modified to a balance after a bonus amount corresponding to the to-be-received object is added. When the to-be-received object is the reward point, the number of reward points of the current login account is modified to the number after the reward points corresponding to the to-be-received object is added. When the to-be-received object is the special effect, a special effect corresponding to the to-be-received object is added to an available special effect library of the current login account.

In an embodiment, after the to-be-received object is sent to the current login account, the method further includes: receiving an invitation response instruction, where invitation response instruction is generated when a click operation acting on the invitation code shared by the user is detected; and switching the current display interface to a current playback interface and playing the target interaction video in the current playback interface, or displaying the prompt window in the current playback interface, where the to-be-received object is received by a user who clicks the invitation code.

In the above embodiment, after the invitation code is shared successfully, the user who shares the invitation code or another user who views the invitation code shared by the user clicks the invitation code (that is, clicks a position where the invitation code is displayed on the screen), so as to receive the to-be-received object corresponding to the invitation code. Correspondingly, after detecting that the user clicks the invitation code, the electronic apparatus confirms a reception of the invitation response instruction, switches the current display interface from the sharing interface to the video playback interface. In addition, the electronic apparatus displays content corresponding to the invitation code in the video playback interface, for example, plays the target interaction video corresponding to the invitation code in the video playback interface and the process returns to S101. Alternatively, the electronic apparatus displays the prompt window in the video playback interface and the process returns to S102. Therefore, the user who clicks the invitation code receives the to-be-received object corresponding to the invitation code, through the prompt window that pops up when the target interaction video is played to the set time node or the prompt window displayed in the video playback interface. Here, the invitation response instruction may be used to instruct the electronic apparatus to play the target interaction video or display a prompt window.

It is understandable that the user may also receive the to-be-received object corresponding to the invitation code by pasting the invitation code into a search box of the target client. For example, the user who shares the invitation code or another user who views the invitation code shared by the user triggers a generation of a copy instruction for copying the invitation code, in order to receive the to-be-received object corresponding to the invitation code. Correspondingly, in response to the copy instruction triggered by the user, the electronic apparatus copies the invitation code, jumps or automatically switches to the homepage of the target client based on the operation of the user, and displays the invitation code in the homepage. When detecting that the user clicks the invitation code displayed on the homepage, the electronic apparatus plays the target interaction video corresponding to the invitation code in the video playback interface or displays the prompt window corresponding to the invitation code in the video playback interface.

With the video interaction method according to this embodiment, a prompt window pops up when the target interaction video in the video playback interface is played to the set time node. In response to a reception of an object receiving instruction generated when a user clicks a receiving control in the prompt window, an invitation code is generated and the prompt window displayed in the video playback interface is switched to a code display window. Then, the current display interface is switched to the sharing interface corresponding to the invitation code in response to a reception of an invitation instruction generated when the user clicks the invitation control in the code display window, and the to-be-received object corresponding to the prompt window is sent to the current login account when it is determined that the invitation code in the sharing interface is successfully shared. With the above technical solutions in this embodiment, the prompt window pops up when the user watches the interaction video, and the corresponding object is sent to the current login account after the user shares the invitation code successfully. In this way, not only various interaction manners and various manners for pushing an interaction task is provided, thereby making the interaction task have a great attraction, but also an interaction way for other users is provided, thereby reducing difficulty for other users to interact with the electronic apparatus through the corresponding client.

Figure 6:
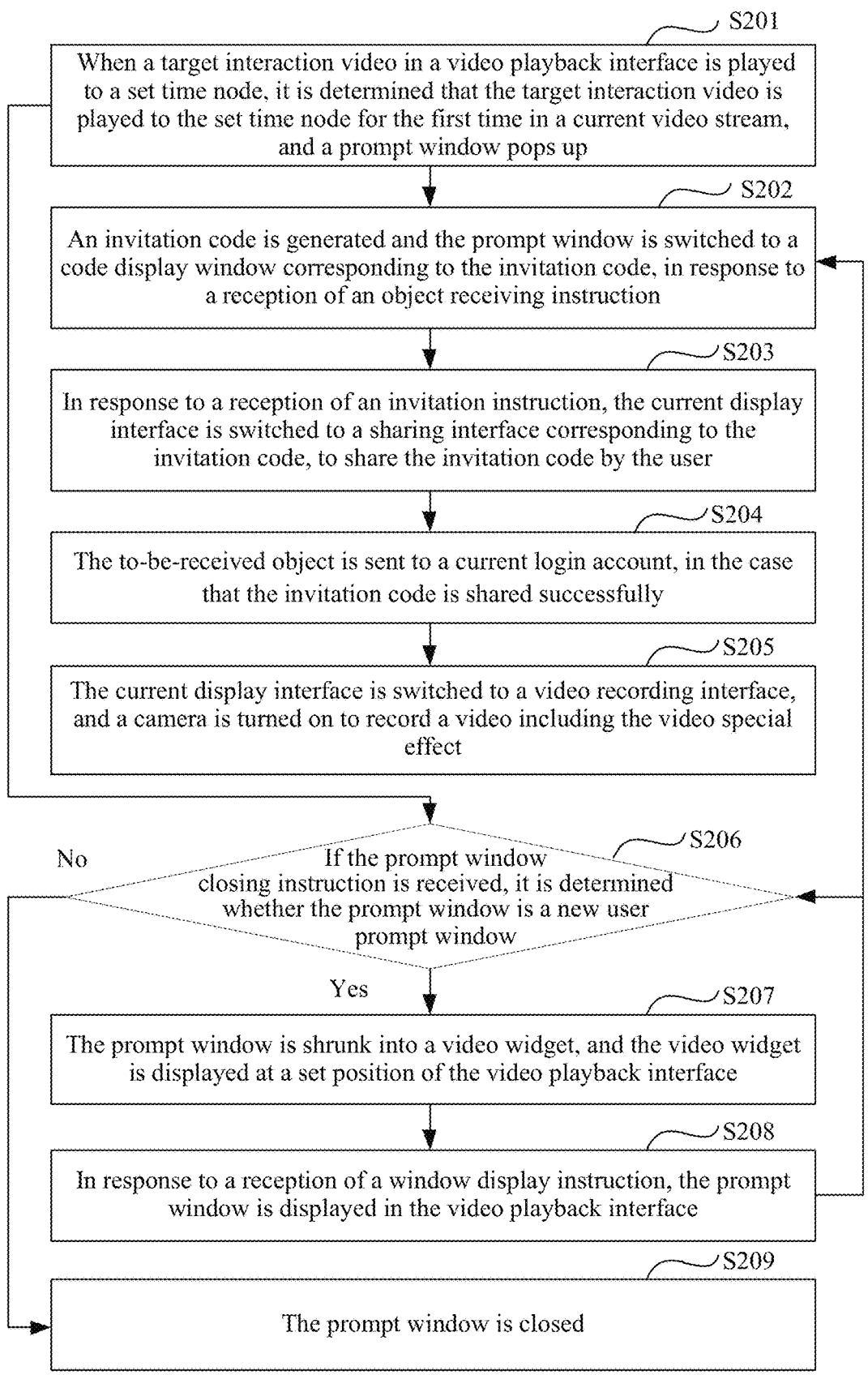
FIG. 6 is a schematic flowchart illustrating a video interaction method according to another embodiment of the present disclosure.

FIG. 6 is a schematic flowchart illustrating a video interaction method according to another embodiment of the present disclosure. The technical solutions in this embodiment may be combined with one or more optional technical solutions in the above-mentioned embodiments. Optionally, the video interaction method according to this embodiment further includes: receiving a prompt window closing instruction, where the prompt window closing instruction is generated when the user clicks an object closing control in the prompt window; determining whether the prompt window is a new user prompt window; shrinking the prompt window into a video widget and displaying the video widget at a set position in the video playback interface if the prompt window is determined to be the new user prompt window; and closing the prompt window if the prompt window is not determined to be the new user prompt window.

Optionally, after the displaying the video widget at a set position in the video playback interface, the method further includes: displaying the prompt window in the video playback interface, in response to a reception of a window display instruction, where the window display instruction is generated when the user clicks the video widget.

Optionally, before popping up the prompt window, the method further includes: determining that the target interaction video is played to the set time node for the first time in the current video stream.

Optionally, the to-be-received object is a video special effect, and after sending the to-be-received object to the current login account, the method further includes: switching the current display interface to a video recording interface, and turning on a camera to record a video including the video special effect.

Correspondingly, as shown in FIG. 6, a video interaction method according to an embodiment includes the following steps S201 to S209.

In S201, when a target interaction video in a video playback interface is played to a set time node, it is determined that the target interaction video is played to the set time node for the first time in a current video stream, a prompt window pops up, and the method proceeds to S202 or S206. Object information of a to-be-received object is displayed in the prompt window. The to-be-received object is a video special effect.

Correspondingly, the target interaction video continues being played without popping up the prompt window, when the target interaction video is not played to the set time node for the first time in the current video stream.

In this embodiment, after the target interaction video is inserted into the original video stream to obtain the current video stream, the prompt window corresponding to the target interaction video is popped up one time only, in the process of playing videos based on the current video stream, thereby further improving experience of the user watching the video.

When the target interaction video is played to the set time instant based on the current video stream, the electronic apparatus determines whether the target interaction video has a played identifier that indicates that the video has been played. In the case that the target interaction video has the played identifier, the electronic apparatus determines that the target interaction video is not played to the set time node for the first time, that is, determines that the prompt window corresponding to the target interaction video has been popped up before the current moment. In this case, the electronic apparatus continues playing the interaction video without popping up the prompt window. When the target interaction video has no played identifier, the electronic apparatus determines that the target interaction video is played to the set time node for the first time, that is, determines that the prompt window corresponding to the target interaction video has not popped up before the current moment. In this case, the electronic apparatus pops up the prompt window, and adds the played identifier to the target interaction video, so that the prompt window corresponding to the target interaction video will not be popped up when the target interaction video is played again.

In S202, an invitation code is generated and the prompt window is switched to a code display window corresponding to the invitation code, in response to a reception of an object receiving instruction. The object receiving instruction is generated when the user clicks a receiving control in the prompt window. The invitation code is used to invite another user to receive the to-be-received object.

In S203, in response to a reception of an invitation instruction, the current display interface is switched to a sharing interface corresponding to the invitation code, to share the invitation code by the user. The invitation instruction is generated when the user clicks an invitation control in the code display window.

In S204, the to-be-received object is sent to a current login account, in the case that the invitation code is shared successfully.

In S205, the current display interface is switched to a video recording interface, and a camera is turned on to record a video including the video special effect. The method ends.

The video recording interface displays an image captured by the camera, and may further displays a recording/stop control and a camera switching control. The user may control the electronic apparatus to start recording a video by clicking the recording/stop control, and control the electronic apparatus to end video recording by clicking the recording/stop control again. Further, the user may switch the camera for video recording between a front camera and a rear camera and/or switch between rear cameras in different types by clicking the camera switching control.

After sending the to-be-received object to the current login account, the electronic apparatus switches the current display interface to the photographing interface, turns on the camera, and adds the video special effect to the image captured by the camera. That is, the electronic apparatus processes, by using the video special effect, the image captured by the camera, and displays the processed image in the video recording interface. The electronic apparatus may start recording a video when detecting that the user clicks the recording/stop control in the video recording interface, so as to obtain the video including the corresponding video special effect.

It is understandable that the to-be-received object may be a photo special effect, such as a photo sticker and a photo filter. In this case, after sending the to-be-received object to the current login account, the electronic apparatus switches the current display interface to the photographing interface, turns on the camera, and processes the image captured by the camera by using the photo special effect. For example, the electronic apparatus adds a corresponding photo sticker to the image captured by the camera or processes the picture captured by the camera by using a corresponding photo filter. The electronic apparatus displays the processed picture in the photographing interface, and acquires and stores the processed picture currently displayed in the photographing interface when detecting that the user clicks a photographing control in the photographing interface, so as to capture a photo including the photo special effect.

In S206, if the prompt window closing instruction is received, it is determined whether the prompt window is a new user prompt window. If the prompt window is the new user prompt window, the method proceeds to S207. If the prompt window is not the new user prompt window, the method proceeds to S209. The prompt window closing instruction is generated when the user clicks the object closing control in the prompt window.

The prompt window closing instruction is used to instruct the electronic apparatus to close the prompt window displayed in the video playback interface.

In this embodiment, reference is made to FIG. 3, the prompt window 30 is further provided with an object closing control 32. The user clicks the object closing control 32 to close the prompt window 30 and resume watching the interaction video. Specifically, a prompt window is popped up in the electronic apparatus. If the user wants to close the prompt window 30, for example, the user does not want to perform the subsequent invitation task or receive the to-be-received object, the user clicks the object closing control 32 in the prompt window 30. Correspondingly, when detecting that the user clicks the object closing control 32 in the prompt window 30, the electronic apparatus confirms a reception of the prompt window closing instruction, and determines whether the currently displayed prompt window 30 is a new user prompt window or not, so as to close the currently displayed prompt window 30 in different manners.

In this embodiment, the manner for determining whether the currently displayed prompt window is the new user prompt window may be selected as demand. For example, whether the currently displayed prompt window is the new user prompt window is determined by determining whether a window identifier of the currently displayed prompt window is a new user window identifier, determining whether the to-be-received object corresponding to the currently displayed prompt window is a new user to-be-received object, or determining whether the target interaction video corresponding to the currently displayed prompt window is a new user interaction video. That is, in the case that the window identifier of the currently displayed prompt window is the new user window identifier, or that the to-be-received object corresponding to the currently displayed prompt window is the new user to-be-received object, or that the target interaction video corresponding to the currently displayed prompt window is the new user interaction video, it is determined that the currently displayed prompt window is the new user prompt window. Otherwise, it is determined that the currently displayed prompt window is a common user prompt window.

In S207, the prompt window is shrunk into a video widget, and the video widget is displayed at a set position of the video playback interface.

In S208, in response to a reception of a window display instruction, the prompt window is displayed in the video playback interface, and the method proceeds to S202 or S206. The window display instruction is generated when the user clicks the video widget.

Figure 7:
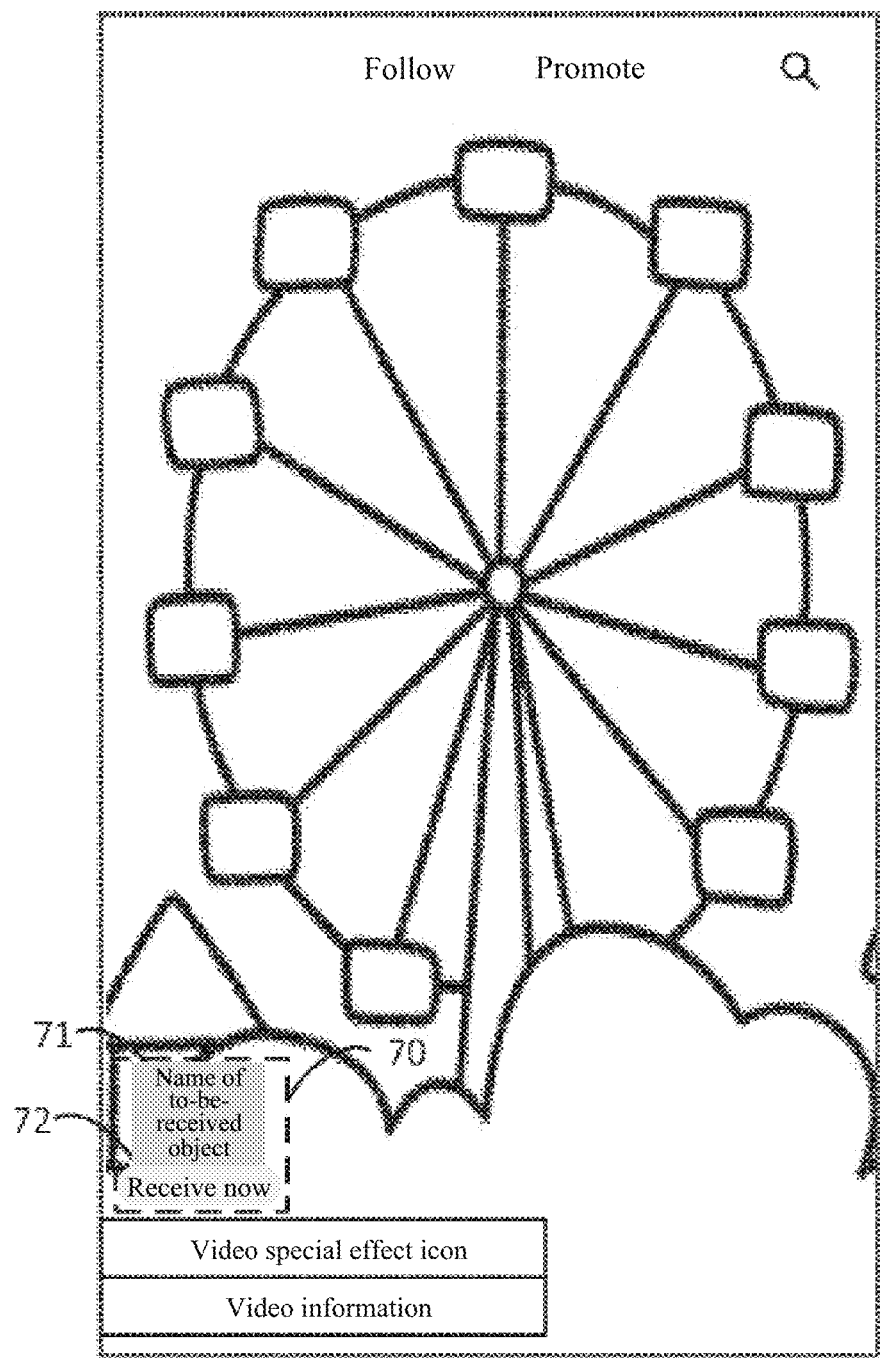
FIG. 7 is a schematic diagram illustrating a video widget according to an embodiment of the present disclosure.

Reference is made to FIG. 7, (for example, a video widget 70 is displayed on the lower left of the video playback interface), the video widget 70 is displayed in the video playback interface and obtained by shrinking the prompt window. The video widget 70 includes an object information area 71 and a prompt area 72. The object information area 71 displays an object name of the to-be-received object, which may be obtained by shrinking the prompt window and moving the prompt window to a set display position. The prompt area 72 may be popped up when the prompt window moves to a preset display position. Here, an operation of shrinking the prompt window and an operation of moving the prompt window may be or may be not performed simultaneously. When the prompt window is shrunk or after the prompt window is shrunk, content originally displayed in the prompt window may be replaced with the object name of the to-be-received object. The position at which the video widget 70 is displayed in the video playback interface may be set as demand. For example, the video widget 70 may be displayed on an upper side, a lower side, a left side or a right side of the video playback interface.

In this embodiment, the currently displayed prompt window being the new user prompt window means that the user is not logged in. That is, the user does not log in to the target client, and even may not register an account of the target client. In this case, the prompt window may be shrunk to a video widget and still displayed in the video playback interface, so as to guide the user to log in or register an account when the to-be-received object corresponding to the prompt window is received.

It is taken that the video widget includes an object information area and a prompt area as an example. When receiving the prompt window closing instruction and determining that the prompt window currently displayed in the video playback interface is the new user prompt window, the electronic apparatus shrinks the prompt window based on a set ratio factor (or shrinks a width and a height of the prompt window in equal proportions to a set width or a set height of the prompt window), replaces the content displayed in the prompt window with the object name of the to-be-received object, moves the prompt window to the set position in the video playback interface along a preset path, and pops up the prompt area. In this way, the video widget corresponding to the prompt window is obtained. The user clicks the video widget in order to view the to-be-received object. Correspondingly, when detecting that the user clicks the video widget, the electronic apparatus determines a reception of the window display instruction, expands the object information area of the video widget into a prompt window by performing a process opposite to the process of shrinking the prompt window into a video widget, and displays the prompt window at an original position at which the prompt window before shrinking is displayed. Therefore, the user may receive the to-be-received object by clicking the receiving control in the prompt window, or shrink the prompt window to the video widget again by clicking the object closing control in the prompt window.

In this embodiment, after the video played in the video playback interface is switched from the target interaction video to another video, the video widget may be displayed still or not displayed. For example, the video widget is displayed still or not displayed regardless of a video type of another video. Alternatively, the video type of another video is taken into consideration. For example, if another switched video is not an interaction video, the video widget is displayed until the user has logged in or the video played in the video playback interface is switched to an interaction video (including a new user interaction video and a common interaction video), thereby avoiding the case that multiple video widgets are displayed in the playback interface, and improving experience of user watching videos via the video playback interface.

In S209, the prompt window is closed.

In this embodiment, the currently displayed prompt window being a common user prompt window means that the user has logged in, that is, the user has registered and logged in to an account of the target client. Thus it is unnecessary to guide the user to register or log in the account. Therefore, when receiving the prompt window closing instruction, the electronic apparatus may close the prompt window and resumes playing the target interaction video.

Therefore, in the process of playing a video based on the current video stream, the electronic apparatus may control, for each target interaction video, a prompt window corresponding to the target interaction video to be popped up one time only, shrinks the prompt window into the video widget when the user closes the new user prompt window, and performs operations in response to received instructions, thereby further improving viewing experience of the user and pushing effect of interaction tasks.

Figure 8:
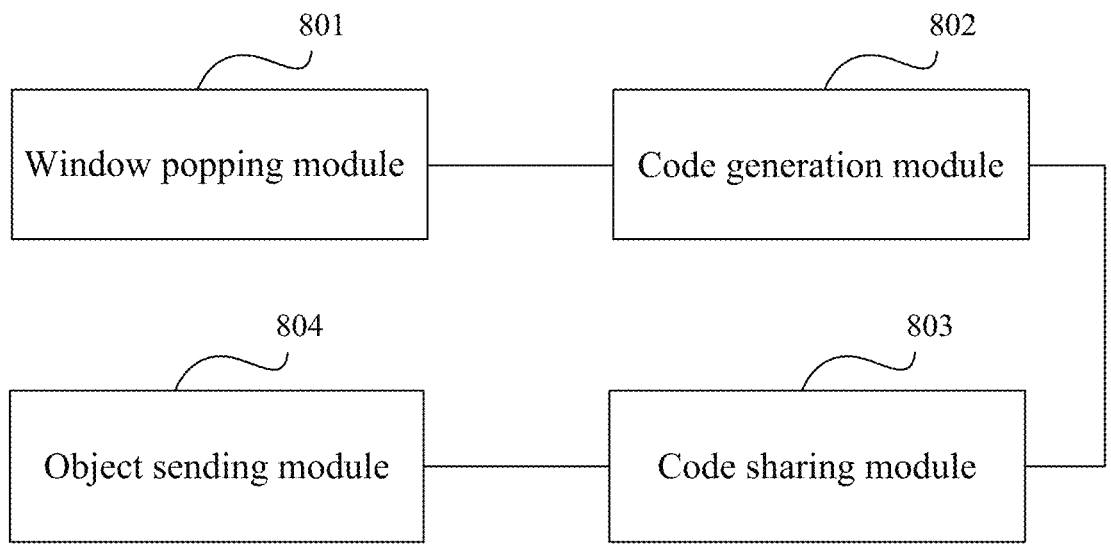
FIG. 8 is a structural block diagram illustrating a video interaction device according to an embodiment of the present disclosure.

FIG. 8 is a structural block diagram illustrating a video interaction device according to an embodiment of the present disclosure. The apparatus may be implemented by software and/or hardware, and may be configured in an electronic apparatus, typically, a smartphone, a tablet computer or a computer. The device may interact with a user by preforming the video interaction method, and is applicable to a scene of watching a video in a video playback interface, and is especially applicable to a scene of watching a video on a homepage (for example, a video recommendation page) of a website or client. As shown in FIG. 8, the video interaction device according to the embodiment of the present disclosure includes: a window popping module 801, a code generation module 802, a code sharing module 803, and an object sending module 804.

The window popping module 801 is configured to pop up a prompt window when a target interaction video in a video playback interface is played to a set time node. Object information of a to-be-received object is displayed in the prompt window.

The code generation module 802 is configured to generate an invitation code in response to a reception of an object receiving instruction, and switch the prompt window to a code display window corresponding to the invitation code. The object receiving instruction is generated when the user clicks a receiving control in the prompt window. The invitation code is used for inviting another user to receive the to-be-received object.

The code sharing module 803 is configured to switch a current display interface to a sharing interface corresponding to the invitation code in response to a reception of an invitation instruction, to share the invitation code by the user. The invitation instruction is generated when the user clicks an invitation control in the code display window.

The object sending module 804 is configured to send the to-be-received object to a current login account after the invitation code is shared successfully.

With the video interaction method according to this embodiment, the window popping module pops up a prompt window when the target interaction video in the video playback interface is played to the set time node. In response to a reception of an object receiving instruction generated when the user clicks the receiving control in the prompt window, the code generation module generates an invitation code and switches the prompt window displayed in the video playback interface to a code display window. The code sharing module switches a current display interface to a sharing interface corresponding to the invitation code in response to a reception of an invitation instruction generated when the user clicks the invitation control in the code display window. The object sending module sends the to-be-received object corresponding to the prompt window to the current login account when it is determined that the invitation code in the sharing interface is successfully shared. With the above technical solutions in this embodiment, the prompt window pops up when the user watches the interaction video, and the corresponding object is sent to the current login account after the user shares the invitation code successfully. In this way, not only various interaction manners and various manners for pushing an interaction task are provided, thereby making the interaction task have a great attraction; but also an interaction way for other users is provided, thereby reducing difficulty for other users to interact with the electronic apparatus through the corresponding client.

In addition, the video interaction device further includes a request sending module, a video inserting module and a video playing module. The request sending module is configured to generate a video sending request carrying login state information of the user, and send the video sending request to a server. The video sending request is used for requesting the server to send the target interaction video corresponding to the login state information to a local terminal. The video inserting module is configured to insert the target interaction video at a set position of an original video stream to obtain the current video stream for a video playback this time. The video playing module is configured to switch, in response to a reception of a received video switching instruction, a video played in the video playback interface based on the current video stream. The video switching instruction is generated in response to a detection of sliding up and down on the video playback interface.

In the above solution, the target interaction video sent by the server is a new user interaction video and the prompt window is a new user prompt window in a case that the user is in a log-out state. The target interaction video sent by the server is an interaction video which has not be watched by the user and the prompt window is a common user prompt window in a case that the user is in a login state.

In addition, the video interaction device further includes a window closing module. The window closing module is configured to receive a prompt window closing instruction, where the prompt window closing instruction is generated when the user clicks an object closing control in the prompt window; determine whether the prompt window is the new user prompt window; shrink the prompt window into a video widget and display the video widget at a set position in the video playback interface if the prompt window is determined to be the new user prompt window; and close the prompt window if it is that the prompt window is not determined to be the new user prompt window.

In addition, the video interaction device further includes a window display module. The window display module is configured to display, after the video widget is displayed at the set position in the video playback interface, the prompt window in the video playback interface in response to a reception of a window display instruction. The window display instruction is generated when the user clicks the video widget.

In addition, the video interaction device further includes a state determining module, a login module and a login determining module. The state determining module is configured to determine a user login state, before the invitation code is generated. The login module is configured to switch the current display interface to a user login interface to prompt the user to log in with an account in a case that the user is in a log-out state. The login determining module is configured to determine whether a current login account that the user logs in on the user login interface is a new account for first login; send the to-be-received object to the current login account in a case that the current login account is the new account; and switch the current display interface to the video playback interface, and display the common user prompt window in the video playback interface in a case that the current login account is not the new account.

In addition, the video interaction device further includes a play determining module. The play determining module is configured to determine, before the prompt window pops up, that the target interaction video is played to the set time node for a first time in the current video stream.

In addition, the video interaction device further includes a code response module. The code response module is configured to receive an invitation response instruction after the to-be-received object is sent to the current login account, where the invitation response instruction is generated when a click operation on the invitation code shared by the user is detected; and switch the current display interface to a current playback interface and play the target interaction video in the current playback interface, or display the prompt window in the current playback interface for a user who clicks the invitation code to receive the to-be-received object.

In the above solution, the to-be-received object is a video special effect, and the video interaction device further includes a video recording module. The video recording module is configured to after the to-be-received object is sent to the current login account, switch the current display interface to a video recording interface, and turn on a camera to record a video including the video special effect.

The video interaction device according to the embodiment of the present disclosure is configured to perform the video interaction method according to any embodiment of the present disclosure, and has functional modules and beneficial effects corresponding to the video interaction method. For technical details not described in detail in this embodiment, reference may be made to the video interaction method according to any embodiment of the present disclosure.

A non-transitory computer-readable storage medium is further provided according to an embodiment of the present disclosure. The non-transitory computer-readable storage medium stores computer instructions for causing a computer to implement the video interaction method according to the foregoing method embodiments.

A computer program product is further provided according to an embodiment of the present disclosure. The computer program product includes a computer program stored on a non-transitory computer readable storage medium. The computer program includes program instructions. When the program instructions are executed by a computer, the computer implements the video interaction method according to the foregoing method embodiments.

A computer program is further provided according to an embodiment of the present disclosure. When the computer program is executed by a computer, the computer implements the video interaction method according to the foregoing method embodiments.

Figure 9:
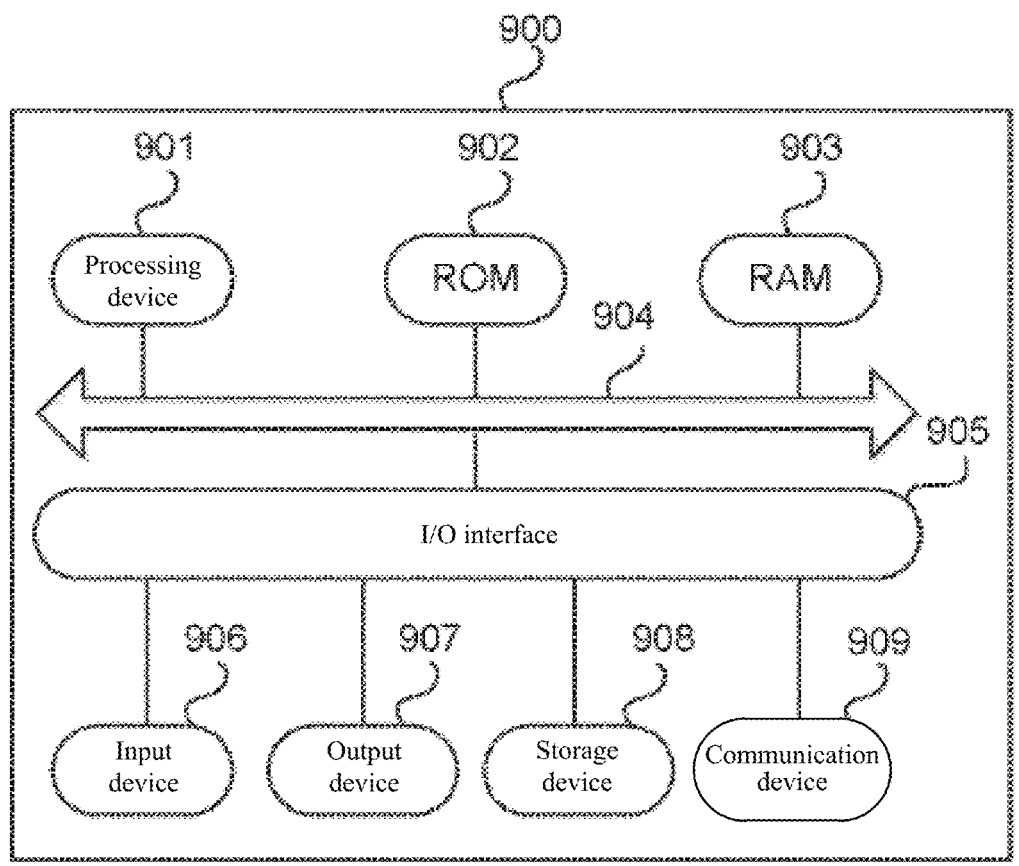
FIG. 9 is a schematic structural diagram illustrating an electronic apparatus according to an embodiment of the present disclosure.

Reference is made to FIG. 9 below, which illustrates a schematic structural diagram of an electronic apparatus (for example, a terminal device) 900 for implementing embodiments of the present disclosure. The terminal device in the embodiments of the present disclosure may include, but is not limited to, a mobile terminal such as a mobile phone, a notebook computer, a digital broadcast receiver, a PDA (Personal Digital Assistant), a PAD (Tablet Computer), a PMP (Portable Multimedia Player), and an in-vehicle terminal (for example, an in-vehicle navigation terminal), and a stationary terminal such as a digital TV and a desktop computer. The electronic apparatus shown in FIG. 9 is an example only, and should not impose any limitation on the function and scope of use of the embodiments of the present disclosure.

As shown in FIG. 9, the electronic apparatus 900 may include a processing device (for example, a central processing unit and a graphics processing unit) 901. The processing device 901 may perform various appropriate actions and processes according to a program stored in a read only memory (ROM) 902 or a program loaded from a storage device 908 into a random-access memory (RAM) 903. Various programs and data necessary for operation of the electronic apparatus 900 are also stored in the RAM 903. The processing device 901, the ROM 902 and the RAM 903 are connected to each other through a bus 904. An input/output (I/O) interface 905 is also connected to the bus 904.

Generally, the following devices may be connected to the I/O interface 905: an input device 906 including, for example, a touchscreen, a touchpad, a keyboard, a mouse, a camera, a microphone, an accelerometer and a gyroscope; an output device 907 including, for example, a liquid crystal display (LCD), a speaker and a vibrator; a storage device 908 including, for example, a magnetic tape and a hard disk; and a communication device 909. The communication device 909 may allow the electronic apparatus 900 to communicate wirelessly or by wire with another device to exchange data. Although FIG. 9 illustrates an electrical device 900 having various devices, it should be understood that not all of the illustrated devices are implemented or available. More or fewer devices may alternatively be implemented or provided.

In particular, according to embodiments of the present disclosure, the processes described above with reference to the flowcharts may be implemented as computer software programs. For example, a computer program product is provided according to embodiments of the present disclosure. The computer program product includes a computer program carried on a non-transitory computer readable medium. The computer program includes program code for performing the method illustrated in the flowchart. In such an embodiment, the computer program may be downloaded and installed from the network via the communication device 909, or from the storage device 908, or from the ROM 902. When the computer program is executed by the processing device 901, the above-mentioned functions defined in the method according to the embodiments of the present disclosure are implemented.

It should be noted that the computer readable medium mentioned above in the present disclosure may be a computer readable signal medium or a computer readable storage medium, or any combination of the two. The computer readable storage medium may be, for example, but not limited to, an electrical, magnetic, optical, electromagnetic, infrared, or semiconductor system, apparatus or device, or a combination of any of the above. More specific examples of the computer readable storage medium may include, but are not limited to, an electrical connection with one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination of the above. In the present disclosure, a computer readable storage medium may be any tangible medium that contains or stores a program. The program may be used by or in conjunction with an instruction execution system, apparatus or device. In the present disclosure, however, a computer readable signal medium may include a data signal propagated in baseband or as part of a carrier wave with computer readable program code embodied thereon. A data signal propagated in such way may be in a variety of forms, including but not limited to, an electromagnetic signal, an optical signal, or any suitable combination of the foregoing. The computer-readable signal medium may also be any computer readable medium other than the computer readable storage medium. The computer readable signal medium may transmit, propagate, or transport the program for use by or in connection with the instruction execution system, apparatus, or device. The program code embodied on the computer readable medium may be transmitted by any suitable medium including, but not limited to, an electrical wire, an optical fiber cable, RF (radio frequency) or the like, or any suitable combination of the foregoing.

In some embodiments, the client and server may communicate by using any currently known or future developed network protocol such as the HTTP (Hyper Text Transfer Protocol), and may be interconnected with digital data communication in any form or medium (for example, a communication network). Examples of the communication network include a local area network ("LAN"), a wide area network ("WAN"), an internet network (for example, the Internet), a peer-to-peer network (for example, ad hoc peer-to-peer network), as well as any currently known or future development network.

The above computer readable medium may be included in the electronic apparatus, or may separate from the electronic apparatus, that is, is not assembled into the electronic apparatus.

The above computer readable medium carries one or more programs. When the one or more programs are executed by the electronic apparatus, the electronic apparatus is configured to pop up a prompt window when a target interaction video in a video playback interface is played to a set time node, where object information of a to-be-received object is displayed in the prompt window; generate an invitation code in response to a reception of an object receiving instruction, and switch the prompt window to a code display window corresponding to the invitation code, where the object receiving instruction is generated when a user clicks a receiving control in the prompt window, and the invitation code is used for inviting another user to receive the to-be-received object; switch a current display interface to a sharing interface corresponding to the invitation code in response to a reception of an invitation instruction, to share the invitation code by the user, where the invitation instruction is generated when the user clicks an invitation control in the code display window; and send the to-be-received object to a current login account after the invitation code is shared successfully.

The computer program code for performing operations of the present disclosure may be written in one or more programming languages, or a combination thereof. Such programming languages include, but are not limited to, object-oriented programming languages such as Java, Smalltalk, C++, and conventional procedural programming languages such as the "C" language or similar programming languages. The program code may be executed entirely on a user computer, partly on the user computer, as a stand-alone software package, partly on the user computer and partly on a remote computer, or entirely on the remote computer or a server. In case of a remote computer, the remote computer may be connected to the user computer through any kind of network, including a local area network (LAN) or a wide area network (WAN). Alternatively, the remote computer may be connected to an external computer (for example, over the Internet provided by an Internet service provider).

The flowcharts and block diagrams in the drawings illustrate the architecture, functionality, and operation of possible implementations of the system, the method and the computer program product according to embodiments of the present disclosure. In this regard, each block in the flowcharts or block diagrams may represent a module, program segment, or portion of code. The module, program segment, or portion of code contains one or more executable instructions for implementing specified logical functions. It should also be noted that, in some alternative implementations, the functions noted in the blocks may be implemented in an order differing from the order noted in the drawings. For example, two blocks shown in succession may, in fact, be performed substantially concurrently, or in a reverse order, depending upon the functionality involved. It should further be noted that each block in the block diagrams and/or flowchart illustrations and a combination of blocks in the block diagrams and/or flowchart illustrations may be implemented by a special purpose hardware-based system that perform specified functions or operations, or a combination of special purpose hardware and computer instructions.

The units involved in the embodiments of the present disclosure may be implemented in a software manner, and may also be implemented in a hardware manner. Names of the modules do not limit the modules in a certain case.

The functions described herein above may be performed, at least in part, by one or more hardware logic components. For example, without limitation, exemplary types of hardware logic components that may be used include: a field programmable gate array (FPGA), an application specific integrated circuit (ASIC), an application specific standard product (ASSP), a system on chip (SOC), a complex programmable logical device (CPLD) and the like.

In the context of the present disclosure, a machine-readable medium may be a tangible medium that may contain or store a program for use by or in combination with the instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include an electrical connection with one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage device, a magnetic storage device, or any suitable combination of the above.

According to one or more embodiments of the present disclosure, a video interaction method is provided according to a first example. The video interaction method includes:
    popping up a prompt window when a target interaction video in a video playback interface is played to a set time node, where object information of a to-be-received object is displayed in the prompt window;
    generating an invitation code in response to a reception of an object receiving instruction, and switching the prompt window to a code display window corresponding to the invitation code, where the object receiving instruction is generated when a user clicks a receiving control in the prompt window, and the invitation code is used for inviting another user to receive the to-be-received object;

switching a current display interface to a sharing interface corresponding to the invitation code in response to a reception of an invitation instruction, to share the invitation code by the user, where the invitation instruction is generated when the user clicks an invitation control in the code display window;

sending the to-be-received object to a current login account in a case that the invitation code is shared successfully.

The method further includes: generating a video sending request that carries login state information of the user, and sending the video sending request to a server, where the video sending request is used for requesting the server to send the target interaction video corresponding to the login state information to a local terminal;

inserting the target interaction video at a set position of an original video stream, to obtain a current video stream for a video playback this time; and switching a video played in the video playback interface based on the current video stream, in response to a reception of a video switching instruction, where the video switching instruction is generated in response to a detection of sliding up and down on the video playback interface.

According to one or more embodiments of the present disclosure, a method similar to that in the second example is provided according to a third example. In a case that the user is in a log-out state, the target interaction video sent by the server is a new user interaction video and the prompt window is a new user prompt window; and in a case that the user is in a login state, the target interaction video sent by the server is an interaction video which has not be watched by the user and the prompt window is a common user prompt window.

According to one or more embodiments of the present disclosure, a method similar to that in the third example is provided according to a fourth example. The method includes:

receiving a prompt window closing instruction, where the prompt window closing instruction is generated when the user clicks an object closing control in the prompt window; and determining whether the prompt window is the new user prompt window; shrinking the prompt window into a video widget and displaying the video widget at a set position in the video playback interface if the prompt window is the new user prompt window; and closing the prompt window if the prompt window is not the new user prompt window.

According to one or more embodiments of the present disclosure, a method similar to that in the fourth example is provided according to a fifth example. After displaying the video widget at a set position in the video playback interface, the method includes:

displaying the prompt window in the video playback interface in response to a reception of a window display instruction, where the window display instruction is generated when the user clicks the video widget.

According to one or more embodiments of the present disclosure, a method similar to that in the third example is provided according to a sixth example. Before generating an invitation code, the method includes:

determining a user login state;

switching the current display interface to a user login interface to prompt the user to log in with an account, in a case that the user is in the log-out state; and determining whether a current login account that the user logs in on the user login interface is a new account for first login; sending the to-be-received object to the current login account if the current login account is the new account; and switching the current display interface to the video playback interface and displaying the common user prompt window in the video playback interface if the current login account is not the new account.

According to one or more embodiments of the present disclosure, a method similar to any one of the first example to the sixth example is provided according to a seventh example. Before popping up a prompt window, the method further includes:

determining that the target interaction video is played to the set time node for a first time in the current video stream.

According to one or more embodiments of the present disclosure, a method similar to any one of the first example to the sixth example is provided according to an eighth example. After sending the to-be-received object to a current login account, the method includes:

receiving an invitation response instruction, where the invitation response instruction is generated when a click operation on the invitation code shared by the user is detected; and switching the current display interface to a current playback interface; and playing the target interaction video in the current playback interface or displaying the prompt window in the current playback interface for a user who clicks the invitation code to receive the to-be-received object.

According to one or more embodiments of the present disclosure, in a method similar to any one of the first example to the sixth example is provided according to a ninth example, the to-be-received object is a video special effect, and after sending the to-be-received object to the current login account, the method includes:

switching the current display interface to a video recording interface, and turning on a camera to record a video including the video special effect.

According to one or more embodiments of the present disclosure, a video interaction device is provided according to a tenth example. The device includes:

a window popping module configured to pop up a prompt window when a target interaction video in a video playback interface is played to a set time node, where object information of a to-be-received object is displayed in the prompt window;

a code generation module configured to generate an invitation code in response to a reception of an object receiving instruction, and switch the prompt window to a code display window corresponding to the invitation code, where the object receiving instruction is generated when a user clicks a receiving control in the prompt window, and the invitation code is used for inviting another user to receive the to-be-received object;

a code sharing module configured to switch a current display interface to a sharing interface corresponding to the invitation code in response to a reception of an invitation instruction, to share the invitation code by the user, where the invitation instruction is generated when the user clicks an invitation control in the code display window; and an object sending module configured to send the to-be-received object to a current login account after the invitation code is shared successfully.

According to one or more embodiments of the present disclosure, in Example 11, an electronic apparatus is provided according to an eleventh example. The electronic apparatus includes: one or more processors; and a memory configured to store one or more programs, where the one or more processors are configured to execute the one or more programs to implement the video interaction method according to any one of the first example to the ninth example.

According to one or more embodiments of the present disclosure, a computer readable storage medium storing a computer program is provided according to a twelfth example, where the program is configured to be executed by a processor to implement the video interaction method according to any one of the first example to the ninth example.

According to one or more embodiments of the present disclosure, a computer program product is provided according to a thirteenth example. The computer program product includes computer program instructions for causing a computer to implement the video interaction method according to any one of the first example to the ninth example.

According to one or more embodiments of the present disclosure, a computer program is provided according to the fourteenth example, where when the computer program runs on a computer, the computer implements the video interaction method according to any one of the first example to the ninth example.

The above description includes merely preferred embodiments of the present disclosure and illustrations of the technical principles employed. Those skilled in the art should understand that the disclosure scope involved in the present disclosure is not limited to the technical solutions formed by the specific combination of the above-mentioned technical features, and also cover other technical solutions formed by any combination of the above technical features or their equivalents without departing from the above disclosed concept.

Additionally, although operations are illustrated in a particular order, it should not be construed as that the operations are required to be performed in the particular order shown or in a sequential order. Under certain circumstances, multitasking and parallel processing may be advantageous. Likewise, although the above illustration involves several implementation-specific details, these should not be construed as limitations on the scope of the present disclosure. Certain features that are described in separate embodiments may be implemented in combination in a single embodiment. Alternatively, features that are described in a single embodiment may be implemented in multiple embodiments separately or in any suitable sub-combination.

Although the subject matter has been described in language specific to structural features and/or logical operations of method, it should be understood that the subject matter defined in the appended claims is unnecessarily limited to the specific features or operations described above. Instead, the specific features and operations illustrated above are merely examples of implementing the claims.

The invention claimed is:

1. A video interaction method, comprising:
generating a video sending request that carries login state information of a user, and sending the video sending request to a server, wherein the login state information indicates whether the user is in a login state or in a log-out state, and the video sending request is used for requesting the server to send a target interaction video corresponding to the login state information;

receiving the target interaction video from the server;

popping up a prompt window in response to the target interaction video being played to a set time node on a video playback interface, wherein object information of a to-be-received object is displayed in the prompt window, the prompt window comprises a receiving control;

generating an invitation code in response to a reception of an object receiving instruction, and switching the prompt window to a code display window corresponding to the invitation code, wherein the object receiving instruction is generated in response to clicking the receiving control in the prompt window, and the invitation code is used for inviting a further user to receive the to-be-received object, and an invitation control is displayed in the code display window and is used for sharing the invitation code;

switching a current display interface to a sharing interface corresponding to the invitation code in response to a reception of an invitation instruction, and sharing the invitation code to invite the further user to receive the to-be-received object, wherein the invitation instruction is generated in response to clicking the invitation control in the code display window, and the sharing interface is configured to share the invitation code to other users, and the invitation code is displayed on the sharing interface; and sending the to-be-received object to a current login account; and switching the current display interface back to the video playback interface to resume playing the target interaction video, in response to sharing the invitation code to the further user successfully, wherein the receiving the target interaction video from the server comprises:
in response to the login state information indicating that the user is in a log-out state, receiving an interaction video for a new user as the target interaction video, wherein the prompt window is a new user prompt window; and
in response to the login state information indicating that the user is in a login state, receiving an interaction video which has not been watched by the user, as the target interaction video, wherein the prompt window is a common user prompt window and the common user prompt window is different from the new user prompt window.

2. The video interaction method according to claim 1, further comprising:
inserting the target interaction video at a set position of an original video stream, to obtain a current video stream for a video playback this time; and
switching a video played in the video playback interface based on the current video stream, in response to a reception of a video switching instruction, wherein the video switching instruction is generated in response to a detection of sliding up and down on the video playback interface.

3. The video interaction method according to claim 1, further comprising:

receiving a prompt window closing instruction, wherein the prompt window closing instruction is generated in response to clicking an object closing control in the prompt window; and determining whether the prompt window is the new user prompt window; shrinking the prompt window into a video widget and displaying the video widget at a set position in the video playback interface if the prompt window is the new user prompt window; and closing the prompt window if the prompt window is not the new user prompt window.

4. The video interaction method according to claim 3, wherein after displaying the video widget at a set position in the video playback interface, the video interaction method further comprises:

displaying the prompt Window in the video playback interface in response to a reception of a window display instruction, wherein the window display instruction is generated in response to clicking the video widget.

5. The video interaction method according to claim 1, wherein before generating an invitation code, the video interaction method further comprises:

determining a user login state;

switching the current display interface to a user login interface to prompt the user to log in with an account if the user is in the log-out state; and determining whether the current login account that the user logs in on the user login interface is a new account for first login; sending the to-be-received object to the current login account if the current login account is the new account; and switching the current display interface to the video playback interface and displaying the common user prompt window in the video playback interface if the current login account is not the new account.

6. The video interaction method according to claim 1, wherein before popping up a prompt window, the video interaction method further comprises:

determining that the target interaction video is played to the set time node for a first time in a current video stream.

7. The video interaction method according to claim 1, wherein after sending the to-be-received object to a current login account, the video interaction method further comprises:

receiving an invitation response instruction, wherein the invitation response instruction is generated in response to a detection of a click operation on the invitation code shared by the user; and switching the current display interface to a current playback interface; and playing the target interaction video in the current playback interface or displaying the prompt window in the current playback interface for a user who clicks the invitation code to receive the to-be-received object.

8. The video interaction method according to claim 1, wherein the to-be-received object is a video special effect; and after sending the to-be-received object to a current login account, the video interaction method further comprises:

switching the current display interface to a video recording interface, and turning on a camera to record a video comprising the video special effect.

9. A video interaction device, comprising:
one or more processors; and
a memory configured to store one or more programs, wherein the one or more processors are configured to execute the one or more programs to:

generate a video sending request that carries login state information of a user, and send the video sending request to a server, wherein the login state information indicates whether the user is in a login state or in a log-out state, and the video sending request is used for requesting the server to send a target interaction video corresponding to the login state information:

receive the target interaction video from the server;

pop up a prompt window in response to the target interaction video being played to a set time node on a video playback interface, wherein object information of a to-be-received object is displayed in the prompt window, the prompt window comprises a receiving control and the to-be-received object comprises at least one of a bonus, an effect or a reward point;

generate an invitation code in response to a reception of an object receiving instruction, and switch the prompt window to a code display window corresponding to the invitation code, wherein the object receiving instruction is generated in response to clicking a receiving control in the prompt window, and the invitation code is used for inviting a further user to receive the to-be-received object, and an invitation control is displayed in the code display window and is used for sharing the invitation code;

switch a current display interface to a sharing interface corresponding to the invitation code in response to a reception of an invitation instruction, and sharing the invitation code to invite the further user to receive the to-be-received object, wherein the invitation instruction is generated in response to clicking the invitation control in the code display window, and the sharing interface is configured to share the invitation code to other users, and the invitation code is displayed on the sharing interface; and send the to-be-received object to a current login account and switch the current display interface back to the video playback interface to resume playing the target interaction video, in response to sharing the invitation code to the further user successfully, wherein the one or more processors are configured to execute the one or more programs to:

in response to the login state information indicating that the user is in a log-out state, receive an interaction video for a new user as the target interaction video wherein the prompt window is a new user prompt window; and in response to the login state information indicating that the user is in a login state, receive an interaction video which has not been watched by the user, as the target interaction video, wherein the prompt window is a common user prompt window and the common user prompt window is different from the new user prompt window.

10. The video interaction device according to claim 9, wherein the one or more processors are configured to execute the one or more programs further to:

insert the target interaction video at a set position of an original video stream, to obtain a current video stream for a video playback this time; and switch a video played in the video playback interface based on the current video stream, in response to a reception of a video switching instruction, wherein the video switching instruction is generated in response to a detection of sliding up and down on the video playback interface.

11. The video interaction device according to claim 9, wherein the one or more processors are configured to execute the one or more programs further to:
  receive a prompt window closing instruction, wherein the prompt window closing instruction is generated in response to clicking an object closing control in the prompt window; and
  determine whether the prompt window is the new user prompt window; shrink the prompt window into a video widget and display the video widget at a set position in the video playback interface if the prompt window is the new user prompt window; and
  close the prompt window if the prompt window is not the new user prompt window.

12. The video interaction device according to claim 11, wherein the one or more processors are configured to execute the one or more programs further to:
  display the prompt window in the video playback interface in response to a reception of a window display instruction, wherein the window display instruction is generated in response to clicking the video widget.

13. The video interaction device according to claim 9, wherein the one or more processors are configured to execute the one or more programs further to:
  determine a user login state;
  switch the current display interface to a user login interface to prompt the user to log in with an account if the user is in the log-out state; and
  determine whether the current login account that the user logs in on the user login interface is a new account for first login; send the to-be-received object to the current login account if the current login account is the new account; and switch the current display interface to the video playback interface and display the common user prompt window in the video playback interface if the current login account is not the new account.

14. The video interaction device according to claim 9, wherein the one or more processors are configured to execute the one or more programs further to:
  determine that the target interaction video is played to the set time node for a first time in a current video stream.

15. The video interaction device according to claim 9, wherein the one or more processors are configured to execute the one or more programs further to:
  receive an invitation response instruction, wherein the invitation response instruction is generated in response to a detection of a click operation on the invitation code shared by the user; and
  switch the current display interface to a current playback interface; and play the target interaction video in the current playback interface or display the prompt window in the current playback interface for a user who clicks the invitation code to receive the to-be-received object.

16. The video interaction device according to claim 9, wherein the to-be-received object is a video special effect; and the one or more processors are configured to execute the one or more programs further to:
  switch the current display interface to a video recording interface, and turn on a camera to record a video comprising the video special effect.

17. A non-transitory computer readable storage medium storing a computer program, wherein the program is configured to be executed by a processor to:
  generate a video sending request that carries login state information of a user, and send the video sending request to a server, wherein the login state information indicates whether the user is in a login state or in a log-out state, and the video sending request is used for requesting the server to send a target interaction video corresponding to the login state information to a terminal;
  receive the target interaction video from the server;
  pop up a prompt window in response to the target interaction video being played to a set time node on a video playback interface, wherein object information of a to-be-received object is displayed in the prompt window, the prompt window comprises a receiving control and the to-be-received object comprises at least one of a bonus, an effect or a reward point;
  generate an invitation code in response to a reception of an object receiving instruction, and switch the prompt window to a code display window corresponding to the invitation code, wherein the object receiving instruction is generated in response to clicking a receiving control in the prompt window, and the invitation code is used for inviting a further user to receive the to-be-received object, and an invitation control is displayed in the code display window and is used for sharing the invitation code;
  switch a current display interface to a sharing interface corresponding to the invitation code in response to a reception of an invitation instruction, and sharing the invitation code to invite the further user to receive the to-be-received object, wherein the invitation instruction is generated in response to clicking the invitation control in the code display window, and the sharing interface is configured to share the invitation code to other users, and the invitation code is displayed on the sharing interface; and
  send the to-be-received object to a current login account and switch the current display interface back to the video playback interface to resume playing the target interaction video, in response to sharing the invitation code to the further user successfully,
  wherein the program is configured to be executed by the processor to:
  in response to the login state information indicating that the user is in a log-out state, receive an interaction video for a new user as the target interaction video, wherein the rom t window is a new user prompt window; and
  in response to the login state information indicating that the user is in a login state, receive an interaction video which has not been watched by the user, as the target interaction video, wherein the prompt window is a common user prompt window and the common user prompt window is different from the new user prompt window.

18. A computer program product, comprising:
  computer program instructions stored in a non-transitory computer readable storage medium, wherein the computer program instructions, when executed by a computer, cause the computer to implement the video interaction method according to claim 1.

* * * * *